(12) United States Patent
Kwon et al.

(10) Patent No.: US 8,679,675 B2
(45) Date of Patent: Mar. 25, 2014

(54) BATTERY INCLUDING A MEMBER CONFIGURED TO PREVENT A SHORT CIRCUIT

(75) Inventors: Teak Hyen Kwon, Yongin-si (KR); Young Jun Kim, Yongin-si (KR); Min Ho Song, Yongin-si (KR); Byung Jo Jung, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1987 days.

(21) Appl. No.: 11/411,226

(22) Filed: Apr. 26, 2006

(65) Prior Publication Data
US 2006/0257724 A1  Nov. 16, 2006

(30) Foreign Application Priority Data
Apr. 26, 2005  (KR) .............................. 2005-0034745

(51) Int. Cl.
*H01M 2/10* (2006.01)
*H01M 2/02* (2006.01)
*H01M 2/14* (2006.01)
*H01M 10/04* (2006.01)

(52) U.S. Cl.
USPC ................. 429/186; 429/129; 429/8; 429/94; 429/163

(58) Field of Classification Search
USPC ........... 429/8, 61, 65, 94, 121, 122, 129, 163, 429/164, 186
See application file for complete search history.

(56) References Cited

U.S. PATENT DOCUMENTS

| 5,989,743 | A | 11/1999 | Yamashita |
| 7,060,387 | B2 * | 6/2006 | Kim et al. ........................ 429/94 |
| 7,785,736 | B2 | 8/2010 | Oh et al. |
| 2002/0034685 | A1 | 3/2002 | Sato et al. |
| 2003/0113616 | A1 * | 6/2003 | Kasuga et al. .................. 429/94 |
| 2004/0126654 | A1 * | 7/2004 | Sudano et al. ................. 429/162 |
| 2004/0228061 | A1 | 11/2004 | Kim et al. |
| 2004/0265700 | A1 * | 12/2004 | Ugawa et al. .................. 429/331 |

FOREIGN PATENT DOCUMENTS

| EP | 1 041 658 | 10/2000 | |
| EP | 1 143 549 | 10/2001 | |
| JP | 09-161815 | 6/1997 | |
| JP | 09161815 A * | 6/1997 | ............. H01M 6/16 |
| JP | 11260414 A * | 9/1999 | ............ H01M 10/40 |
| JP | 2003-151614 A | 5/2003 | |
| JP | 2004-030938 A | 1/2004 | |
| JP | 2004014374 A * | 1/2004 | ............ H01M 10/04 |
| JP | 2004-311395 A | 11/2004 | |
| KR | 10-2004-0053494 | 6/2004 | |
| KR | 2004053494 A * | 6/2004 | ............ H01M 10/38 |
| KR | 10 2004-0058921 A | 7/2004 | |
| KR | 10 2005-0020552 A | 3/2005 | |

* cited by examiner

*Primary Examiner* — Edu E Enin-Okut
(74) *Attorney, Agent, or Firm* — Lee & Morse, P.C.

(57) ABSTRACT

A battery including a battery case, an electrode assembly disposed in the battery case, the electrode assembly including a winding of a first electrode plate, a second electrode plate and a separator, wherein the separator is interposed between the first and second electrode plates, a cap assembly covering the battery case, and a member configured to prevent a short circuit of the electrode assembly.

10 Claims, 4 Drawing Sheets

BATTERY INCLUDING A MEMBER CONFIGURED TO PREVENT A SHORT CIRCUIT

BACKGROUND OF THE INVENTION

1. Field of the Invention

The present invention relates to a battery. More particularly, the present invention relates to a battery having an electrode assembly including first and second electrode plates housed in a battery case, the battery configured to reduce or prevent the likelihood of an external impact causing a short circuit of the electrode assembly.

2. Description of the Related Art

Batteries are employed in a wide variety of equipment including, to name just a few, vehicles, e.g., electric and hybrid vehicles, portable power tools, electronics, etc. Portable compact electronic devices, e.g., cellular phones, laptop computers, camcorders, etc., are being widely developed and produced. Such portable electronic devices typically include an internal battery pack to allow continuing operation even in places where no external power supply is available. Such a built-in battery pack typically includes at least one unit battery inside and provides the electronic device with a predetermined level of voltage over a reasonable period of time.

Batteries are generally classified as primary or secondary batteries. Primary batteries are commonly known as single-use batteries, and secondary batteries are commonly known as rechargeable batteries. Both primary and secondary batteries may be suitable for use in portable electronic devices. However, the secondary battery is widely adopted because it can be reused and may be, therefore, more economical than single-use batteries. Secondary batteries have been developed using a wide variety of technologies.

Battery technologies currently favored for portable electronic devices include nickel cadmium (Ni—Cd) batteries, nickel metal hydride (Ni—MH) batteries, lithium (Li) and lithium ion (Li-ion) batteries, etc. The lithium batteries have, in particular, been widely employed in the latest generation of electronics devices. A lithium battery may have an operation voltage of 3.6V, which is about three times the operation voltage of the comparable Ni—Cd or Ni—MH batteries. The lithium battery may exhibit a relatively high energy density per unit weight. In a typical lithium battery, a lithium-based oxide may be used as a positive electrode activation material, and a carbon-based material may be used as a negative electrode activation material. Lithium batteries may be classified as liquid electrolyte batteries and polymer electrolyte batteries, depending on the electrolyte used therein. Liquid electrolyte batteries are also known as lithium ion batteries and polymer electrolyte batteries are also known as lithium polymer batteries. The lithium battery may be manufactured in various shapes, e.g., cylindrical, rectangular or prismatic, pouch, etc.

A typical battery may have an electrode assembly, a battery case for housing the electrode assembly and electrolyte injected inside the battery case to give mobility to charge-carrying ions. The electrode assembly may include a positive electrode plate on which a positive activation material is coated, a negative electrode plate on which a negative activation material is coated and a separator interposed between the positive and negative electrode plates. The separator may serve to prevent short circuits between the positive and negative electrode plates and to allow only ions to pass through. The width of the separator of the electrode assembly may be larger width than the widths of the electrode plates, in order to prevent the electrode plates from making contact with each other.

If such a battery suffers an external impact, e.g., by being dropped or hit, it may develop a short circuit. In particular, when the battery suffers an external impact, the separator and the electrode plates may be folded or deformed. This may result in a load being concentrated on corners of a rectangular separator, severely damaging it. As a result of the damage to the separator, the case may make contact with an electrode plate having opposite polarity or the positive and negative electrode plates may make contact with each other, resulting in a short circuit.

SUMMARY OF THE INVENTION

The present invention is therefore directed to a battery, which substantially overcomes one or more of the problems due to the limitations and disadvantages of the related art.

It is therefore a feature of an embodiment of the present invention to provide a battery including a battery case, a cap assembly and an electrode assembly disposed in the battery case, the battery including a member configured to reduce or prevent the likelihood of a short circuit occurring between electrode plates of the electrode assembly and/or between an electrode plate and the battery case.

It is therefore another feature of an embodiment of the present invention to provide a battery including a tape member encircling the electrode assembly and extending beyond the electrode assembly so as to prevent loosening of the electrode assembly and so as to maintain a safe distance between battery components of opposite polarity.

At least one of the above and other features and advantages of the present invention may be realized by providing a battery including a battery case, an electrode assembly disposed in the battery case, the electrode assembly including a winding of a first electrode plate, a second electrode plate and a separator, wherein the separator is interposed between the first and second electrode plates, a cap assembly covering the battery case, and a member configured to prevent a short circuit of the electrode assembly.

The member may be a tape member wound around an outer surface of the electrode assembly, the tape member configured to prevent loosening of the winding of the electrode assembly. A width of the tape member may be about equal to a width of the separator. The tape member and the separator may be in contact with the cap assembly. The tape member may be made of polyethylene or polypropylene. A thickness of the tape member may be within a range of about 20 μm to about 25 μm.

The first electrode plate may extend toward the cap assembly beyond the second electrode plate at an upper side of the electrode assembly, and the tape member may extend toward the cap assembly beyond the first electrode plate.

The first electrode plate may extend away from the cap assembly beyond the second electrode plate at a lower side of the electrode assembly, and the tape member may extend away from the cap assembly beyond the first electrode plate.

The first electrode plate may extend toward the cap assembly beyond the second electrode plate at an upper side of the electrode assembly and may extend away from the cap assembly beyond the second electrode plate at a lower side of the electrode assembly, and the tape member may extend toward the cap assembly beyond the first electrode plate and may extend away from the cap assembly beyond the first electrode plate. A width of the tape member may be about equal to a width of the separator.

The first electrode plate may be a negative electrode plate. The battery case may have a cylindrical shape. The battery case may have a rectangular shape.

At least one of the above and other features and advantages of the present invention may also be realized by providing a battery including a battery case having an electrode assembly disposed therein, the electrode assembly in contact with a bottom surface of the battery case, a cap assembly closing a top of the battery case, the cap assembly in contact with the electrode assembly, and means for wrapping an outer surface of the electrode assembly, preventing an outer electrode plate of the electrode assembly from contacting the battery case, and preventing the outer electrode plate from contacting the cap assembly.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
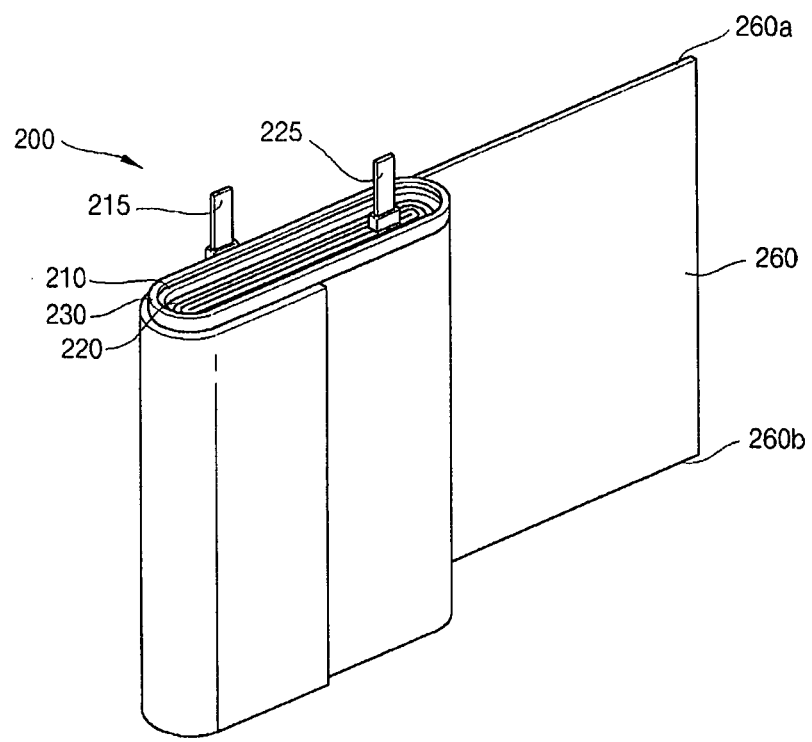
FIG. 1 illustrates a perspective view of an electrode assembly according to a first embodiment of the present invention.

Korean Patent Application No. 10-2005-0034745, filed on Apr. 26, 2005, in the Korean Intellectual Property Office and entitled "Secondary Battery," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

A battery according to the present invention may include an electrode plate support member in order to reduce or prevent the likelihood of the electrode plates and the separator being folded or damaged by an external impact to the battery. That is, the battery is configured to reduce or prevent the likelihood of one of the electrode plates making contact with the other, or with the battery case, even when the battery suffers an impact, thereby enhancing the reliability of the battery.

The battery according to the present invention may reduce or prevent damage to or folding of the upper and/or lower edges of the electrode plates therein when subjected to an external impact. An electrode plate support member wound around the outermost surface of the electrode assembly may include upper and lower electrode plate support portions that upwardly and downwardly extend beyond the width of the electrode assembly to protect the upper and lower edges thereof.

Figure 2:
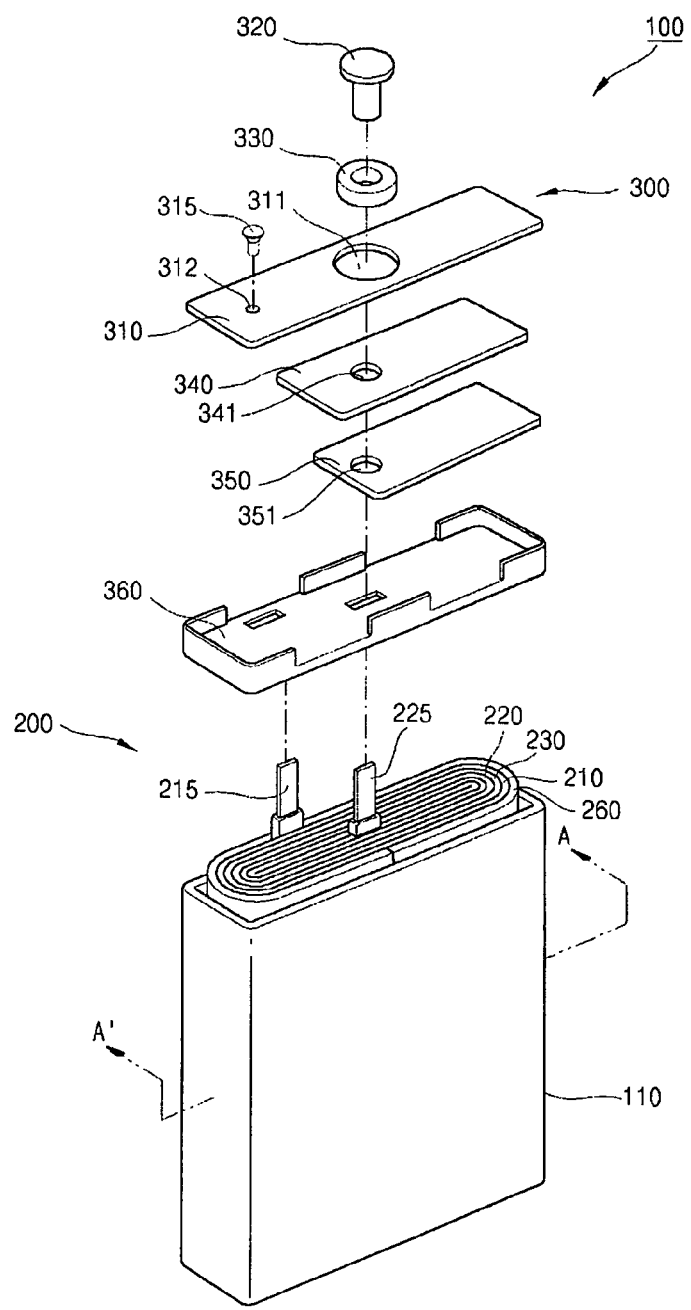
FIGS. 2-3 illustrate exploded and cross-sectional views, respectively, of a battery including the electrode assembly of FIG. 1.
Figure 3:
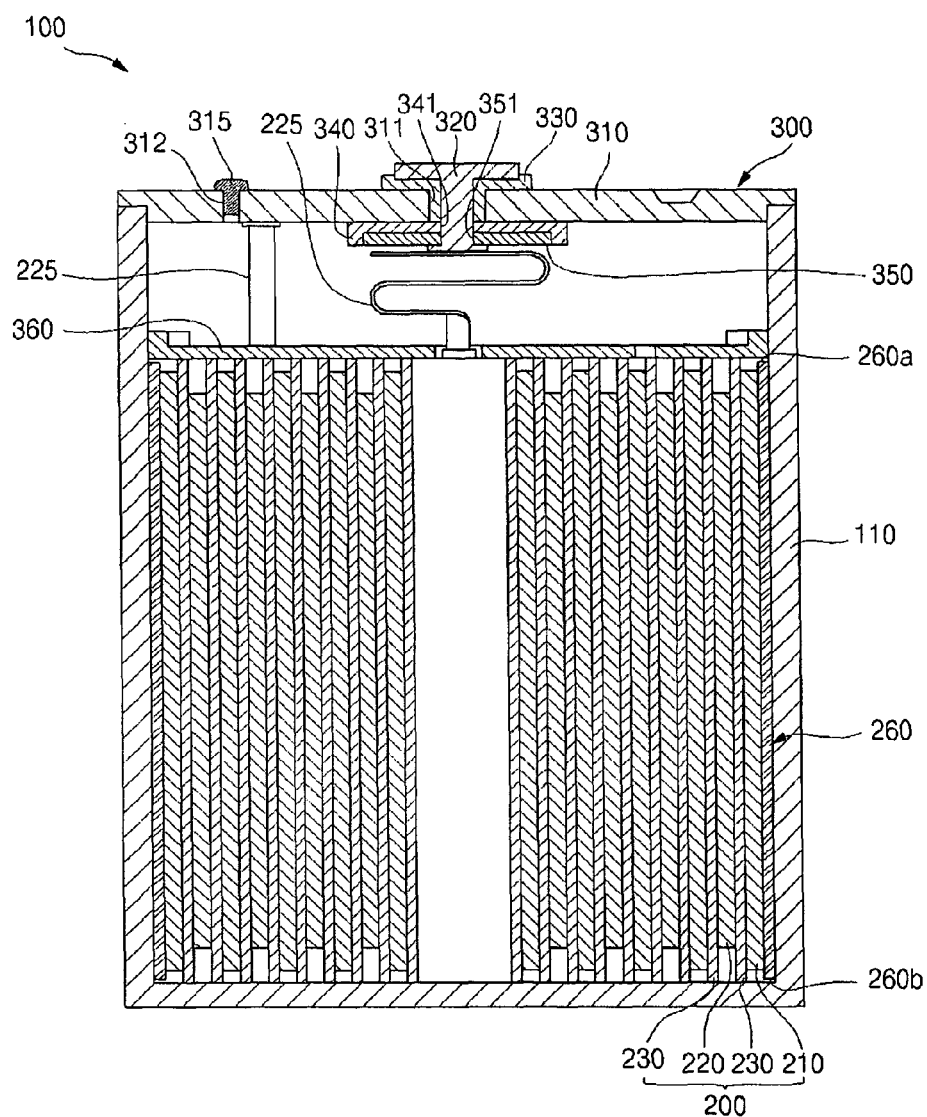

FIG. 1 illustrates a perspective view of an electrode assembly according to a first embodiment of the present invention, and FIGS. 2-3 illustrate exploded and cross-sectional views, respectively, of a battery including the electrode assembly of FIG. 1. Referring to FIGS. 1-3, a battery 100 may include a battery case 110, an electrode assembly 200 housed in the battery case 110 and a cap assembly 300 coupled to the battery case 110. The battery 100 may be assembled by placing the electrode assembly 200 in the battery case 110, then covering the battery case 110 with the cap assembly 300, and then injecting the electrolyte through the cap assembly 300. The battery 100 may be a rectangular battery.

The battery case 110 may have a rectangular shape and an upper opening and may be made of, e.g., a metallic material. The battery case 110 may function as an electrode terminal. For example, where the battery case 110 is rectangular, the battery case 110 may have a negative polarity, and where the battery case 110 is cylindrical, it may have a positive polarity.

The cap assembly 300 may include a cap plate 310, an electrode terminal 320, an insulation plate 340 and a terminal plate 350. The cap assembly 300 may be assembled with a separate insulation case 360 and then combined with the battery case 110 to cover the upper opening of the battery case 110.

The cap plate 310 may be, e.g., a metal plate, and may have a size and shape corresponding to the upper opening of the battery case 110. A first terminal through-hole 311 having a predetermined diameter may be formed in the center of the cap plate 310 and the electrode terminal 320 may be inserted into the first terminal through-hole 311.

When the electrode terminal 320 is inserted into the first terminal through-hole 311, a gasket 330 having a tubular shape may also be installed on an outer surface of the electrode terminal 320, in order to insulate between the electrode terminal 320 and the cap plate 310.

An electrolyte injection hole 312 having a predetermined diameter may be provided on the cap plate 310. After the cap assembly 300 is assembled with the battery case 110 to cover the upper opening, electrolyte may be injected through the electrolyte injection hole 312, and then, the electrolyte injection hole 312 is closed with a plug 315.

The electrode terminal 320 may be connected to a negative electrode tap 225 or a positive electrode tap 215, which correspond to a negative electrode plate 220 and a positive electrode plate 210, respectively. The electrode terminal 320 may function as a negative or positive terminal.

The insulation plate 340 may be made of an insulation material similar to that of the gasket 330, and may be installed on the lower surface of the cap plate 310. The insulation plate 340 may have a second terminal through-hole 341 corresponding to the first electrode through-hole 311 of the cap plate 310, for inserting the electrode terminal 320.

The terminal plate 350 may be made of, e.g., Ni or a Ni alloy, and may be installed on the lower surface of the insulation plate 340. The terminal plate 350 may have a third terminal through-hole 351 corresponding to the first terminal through-hole 311 of the cap plate 310, for inserting the electrode terminal 320. The electrode terminal 320 may be inserted into the first through-hole 311 of the cap plate 310 while the electrode terminal 320 is insulated with the gasket 330, so that the terminal plate 350 is electrically insulated from the cap plate 310 and is electrically connected to the electrode terminal 320.

When the electrode terminal 320 is assembled with the cap plate 310, the insulation plate 340 and the terminal plate 350, the electrode terminal 320 may be inserted into the first terminal through-hole 311 by applying a predetermined force and rotating the electrode terminal 320. After the electrode terminal 320 passes through the first electrode through-hole 311, it may further pass through the second terminal through-hole 341 of the insulation plate 340 and the third terminal through-hole 351 of the terminal plate 350. The inner diameter of the second terminal through-hole 341 formed in the insulation plate 340 may be equal to or slightly larger than the corresponding diameter of the electrode terminal 320 where the two make contact. As a result, the electrode terminal 320 may be tightly inserted and the outer surface thereof may be pressed by the insulation plate 340.

An insulation case 360 may be installed on the upper surface of the electrode assembly 200. The insulation case 360 may cover the upper surface of the electrode assembly 200 and provide electrical insulation between the electrode assembly 200 and the cap assembly 300. The insulation case 360 may have an injection through-hole 315 corresponding to the electrolyte injection hole 312 of the cap plate 310, to allow electrolyte to be injected into the electrode assembly 200. The insulation case 360 may be made of, e.g., a polymer resin having an electrical insulation property, such as polypropylene, etc.

The electrode assembly 200 may be, e.g., a jelly roll type electrode assembly. The electrode assembly 200 may include the first electrode plate 210 having the first electrode tap 215, the second electrode plate 220 having the second electrode tap 225 and a separator 230 interposed between the first and second electrode plates 210, 220, all of which are wound together in the shape of a jelly roll.

Where the first electrode plate 210 serves as a positive electrode, the first electrode plate 210 may be fabricated by coating a positive electrode activation material on both sides of an electrode charge collector, which may be made of, e.g., a thin metal plate having superior conductivity, for example, an aluminum foil. The activation material may include, e.g., chalcogenide compounds, metallic oxide compounds, e.g., $LiCoO_2$, $LiMn_2O_4$, $LiNiO_2$, $LiNi_{1-x}Co_xO_2$ (wherein 0<x<1), $LiMnO_2$, etc.

Where the second electrode plate 220 serves as the negative electrode, the second electrode plate 220 may be fabricated by coating a negative electrode activation material on both sides of an electrode charge collector, which may be, e.g., a metal foil made of Cu or Ni. The negative electrode activation material may include, e.g., carbon-based materials, silicon (Si), tin (Sn), tin oxide, composite tin alloys, transition metal oxides, lithium metal nitrides, lithium metal oxides, etc.

The separator 230 may be interposed between both first and second electrode plates 210, 220. The separator 230 may serve to prevent a short circuit between first and second electrode plates 210, 220 and may allow only charges, e.g., ions, of the battery 100 to pass through the separator 230. The separator 230 may be made of a material such as, e.g., polyethylene, polypropylene, a co-polymer of polyethylene and polypropylene, etc.

The separator 230 may have a wider area than the first and second electrode plates 210, 220, in order to reduce or eliminate the likelihood of a short circuit occurring between the first and second electrode plates 210, 220. That is, the separator 230 may project beyond the first and/or second electrode plates 210, 222 in the direction of the winding axis of the electrode assembly. The separator 230 may project out the top and the bottom in the direction of the winding axis and may make contact with the bottom of the battery case 110 when the electrode assembly 200 is installed in the battery case 110.

Where the first electrode plate 210 serves as a negative electrode, the width of the first electrode plate 210, from which ions are discharged, may be larger than that of the second electrode plate 220. The width of the separator 230 may be larger than that of the first electrode plate 210 and may prevent the first and second electrode plates 210, 220 from making contact with each other.

Referring to FIG. 1, an electrode plate support member 260 may be attached on an outermost surface of the electrode assembly 200 after the electrode assembly 200 is wound into a jelly roll shape. The electrode plate support member 260 may be wound around the electrode assembly 200. The electrode plate support member 260 may prevent loosening of the wound electrode assembly 200 so that the wound stack of the first and second electrode plates 210, 220 and the separator 230 remain tight and in close contact. The electrode plate support member 260 may also function to prevent a short circuit.

The electrode plate support member 260 may be, e.g., tape, a film, a tape and a separate film (not shown), etc. Where the electrode plate support member includes a tape and a separate film, the film may be wound in the first or second layer of the jelly roll electrode assembly 200 together with the electrode plates 210, 220 and the separator 230.

The electrode plate support member 260 may include upper and lower electrode plate support portions 260a and 260b that extend upwardly and/or downwardly in a width direction of the electrode plate support member 260. The extended portions 260a, 260b may prevent an upper part and/or a lower part of a peripheral portion of the electrode assembly 220 from being damaged and causing short circuit when an external shock is applied to the battery. The electrode plate support portions 260a, 260b may be formed by winding a tape member around an outer surface of the electrode assembly 200 to cover the electrode assembly 200 in such a way that the width of the electrode plate support member 260 is wider than that of the electrode assembly 200.

The electrode plate support member 260 may have a thick and/or mechanically strong substrate. For example, where the electrode plate support member 260 includes a tape member, the tape member may be thicker and/or mechanically stronger substrate than conventional tape. The tape member may have an adhesive on one or more sides thereof.

If the width of the first electrode plate 210 is larger than that of the second electrode plate 220, the width of the electrode plate support member 260 may be equal to or larger than that of the first electrode plate 210. In addition, the width of the electrode plate support member 260 may be equal to or larger than that of the separator 230, so that the separator 230 can be covered by the electrode plate support member 260.

Figure 4:
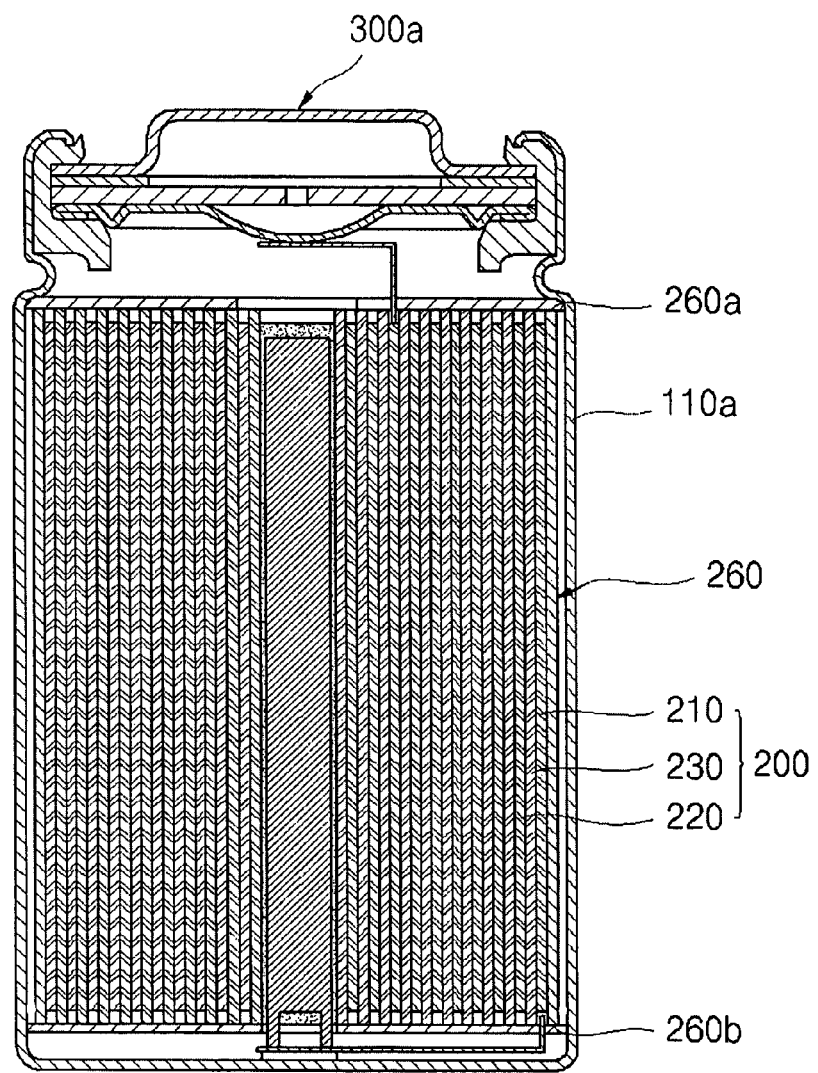
FIG. 4 illustrates a cross-sectional view of a battery according to a second embodiment of the present invention.

Referring to FIG. 4, the battery 100a be a cylindrical battery and may employ a cylindrical battery case 110a. The opening of the battery case 110a may be covered with a corresponding cap assembly 300a. The electrode plate support portions 260a and 260b may be formed in a similar way to that of the rectangular battery 100 described above.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery, comprising:
 a battery case;
 an electrode assembly disposed in the battery case, the electrode assembly including a winding of a first electrode plate, a second electrode plate and a separator, the separator being interposed between the first and second electrode plates and the separator extending away from a cap assembly beyond the first and second electrode plates at least at a lower side of the electrode assembly, wherein the separator contacts a bottom of the battery case, while the first and second electrode plates are spaced apart from the bottom of the battery case;
 an insulation case disposed over an upper side of the electrode assembly in the battery case, wherein the separator contacts the insulation case, while the first and second electrode plates are spaced apart from the insulation case;
 the cap assembly covering the battery case; and
 a tape member wound around an outer surface of the electrode assembly, wherein:
 the tape member is configured to prevent a short circuit of the electrode assembly and to prevent loosening of the winding of the electrode assembly,
 a first end of the tape member extends away from the cap assembly beyond the first and second electrode plates at the lower side of the electrode assembly toward the bottom of the battery case, the first end of the tape member being spaced apart from the bottom of the battery case, and
 a second end of the tape member extends toward the insulation case beyond the first and second electrode plates at the upper side of the electrode assembly, the second end of the tape member being spaced apart from the insulation case, and
 the separator extends away from the cap assembly beyond the first end of the tape member, and the separator extends toward the insulation case beyond the second end of the tape member.

2. The battery as claimed in claim 1, wherein the tape member is made of polyethylene or polypropylene.

3. The battery as claimed in claim 1, wherein a thickness of the tape member is within a range of about 20 μm to about 25 μm.

4. The battery as claimed in claim 1, wherein the first electrode plate is a negative electrode plate.

5. The battery as claimed in claim 1, wherein the battery case has a cylindrical shape.

6. The battery as claimed in claim 1, wherein the battery case has a rectangular shape.

7. The battery as claimed in claim 1, wherein tape member is wound around an outer surface of the electrode assembly and a separate film.

8. The battery as claimed in claim 7, wherein the separate film is wound in the electrode assembly with the first and second electrode plates.

9. The battery as claimed in claim 1, wherein the lateral end of the tape member is not in direct contact with a lower surface of the battery case at the lower side of the electrode assembly.

10. The battery as claimed in claim 1, wherein the bottom of the battery case includes an insulation plate.

* * * * *